May 8, 1951          J. L. RUSSELL          2,552,296

CONSTANT SPEED APPARATUS

Filed Oct. 27, 1944

INVENTOR.
John L. Russell
BY
E. C. Sanborn
Attorney

Patented May 8, 1951

2,552,296

UNITED STATES PATENT OFFICE 2,552,296

CONSTANT SPEED APPARATUS

John L. Russell, Waterbury, Conn., assignor to The Bristol Company, Waterbury, Conn., a corporation of Connecticut Application October 27, 1944, Serial No. 560,692

3 Claims. (Cl. 318—325)

This invention relates to constant speed apparatus, and more particularly to a direct current motor of small size and including means whereby its running speed may be maintained constant under a wide variety of operating conditions.

In certain mechanisms it is essential that moving parts be driven with a velocity which shall be maintained constant with a high degree of precision while the mechanism and the driving motor are subjected to unavoidable wide variations in external conditions. As an example of devices wherein this requirement exists may be mentioned meteorological instruments which must be sent aloft in free or captive balloons for the purpose of determining conditions in the upper atmosphere. In some forms of these instruments a record chart is driven by a small motor and receives a graphic record of one or more conditions to which the apparatus is exposed. In another form coded signals are sent out by radio waves, to be received at a ground station and there translated into a suitable record of conditions characterizing the space surrounding the transmitting instrument. In both these forms of instruments, and more especially in the latter, it is essential that certain elements of the apparaus be driven at a constant velocity, and that this constancy be maintained without regard to changes in temperature, barometric pressure, position, acceleration, or changes in the intensity of stored energy from which the apparatus is driven. The latter instrument is known by the name of "radiosonde," and is widely used in meteorological investigations. It has been found that clockwork of the conventional type, having a spring motor with an escapement or other means for regulating its velocity, in order to be sufficiently powerful for the purpose in hand, will have a weight too great for the available lifting power of the balloon by which the instrument is to be carried aloft. Furthermore, the design of a clockwork which will operate dependably and with required accuracy through the wide range of variables to which such apparatus must be exposed, presents such elements of design as to render its use generally impracticable.

It is an object of the present invention to provide a miniature motor adapted for operation from a small battery of relatively light weight, and to be sufficiently powerful and efficient that it may dependably operate the mechanism of a radiosonde or similar instrument over an extended period of time.

It is a further object of the invention to provide a motor of the above class in which the speed shall be maintained constant at a predetermined velocity without respect to such wide changes in battery voltage as may result from extremes of temperature or from material weakening of the battery or long-continued loads.

It is a further object of the invention to provide a motor of the above class which shall maintain its predetermined velocity through wide changes in the temperature to which the motor is exposed.

It is a further object of the invention to provide a motor of the above class which shall maintain its predetermined velocity without respect to position, orientation, acceleration and barometric pressure.

It is a further object of the invention to provide a motor of the above class which shall be essentially self-starting upon the application of a suitable operating voltage.

It is a further object of the invention to provide a motor of the above class in which the operating velocity is readily adjustable through a wide range of predetermined speed values.

In carrying out the purposes of the invention, the embodiment herein disclosed provides a motor having a permanently magnetized field structure with which coacts an armature structure having an even number of salient poles, carrying separate windings having one end of each connected to a corresponding segment of a suitable commutator and the other ends brought to a common point including contacts adapted to be opened and closed by means of a centrifugal structure integral with the rotating element.

Other features of the invention will be hereinafter described and claimed.

Figure 2:
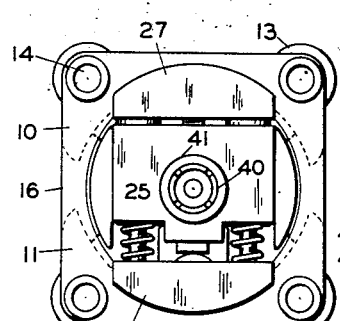
Fig. 2 is an end elevation of the same, having an end-plate removed to permit a clearer view of certain of the operating elements.
Figure 1:
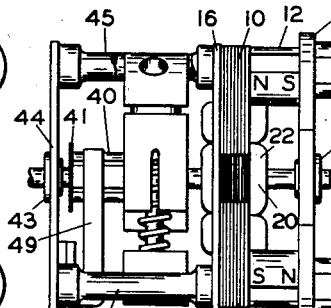
Fig. 1 is a side elevation of a motor embodying the principles of the invention.

Referring now to the drawings:

The field structure of the motor comprises a pair of pole pieces 10 and 11, four identical permanent magnet elements 12, and a combined yoke and journal member 13. The latter member is formed of ferromagnetic material such as "mild" steel, and has a substantially cruciform conformation, being provided at the extremity of each of its four arms with an opening adapted to receive one of four mounting bolts 14 formed of non-magnetic material. Centrally located on the member 13 is a bearing 15, preferably of antifriction metal, and bored to receive the shaft of a rotatable armature presently to be described.

The pole pieces 10—11 are built up of a suitable number of laminations of ferromagnetic material, each punched or otherwise formed with perforations spaced to facilitate stacking upon adjacent mounting bolts 14 when the same are positioned in the openings of the member 13, and having three sides in substantially rectangular conformation and a fourth side concave and of circular curvature. Said fourth side of the laminations are so formed that when said pole pieces are assembled with their concave surfaces facing each other there will be provided a field space adapted to enclose a substantially cylindrical structure but that the radius of curvature of the pole faces will be greater than that of the maximum diameter cylindrical structure which could be placed between them. Positive register of the pole pieces is assured by means of a flat spacing plate 16 of rigid non-magnetic material having bolt holes corresponding to those in the yoke member 13 and adapted to be clamped against the laminated pole pieces by the bolts 14.

The four magnet elements 12 are formed preferably of high-coercive force material, such as "Alnico," and are of substantially cylindrical conformation, each having a deep lateral axial groove, to accommodate one of the mounting bolts 14. Each element is permanently magnetized in an axial sense, and when assembled said elements are disposed with the north poles of two in magnetic contact with one, and the south poles of two in contact with the other, of said pole pieces, and each embracing one of said mounting bolts, whereby when the nuts on said bolts are tightened there will be formed a permanently magnetized field structure having one of the laminated pole pieces of north, and the other of south, polarity and a return path for flux provided by the member 13.

Figure 3:
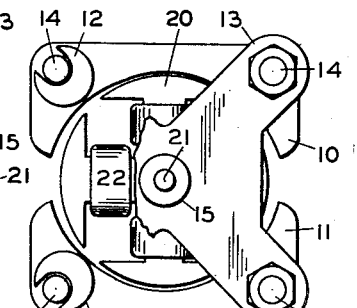
Fig. 3 is a view of the same from the opposite end to Fig. 2, having a portion of an end-plate broken away.
Figures 4, 5:
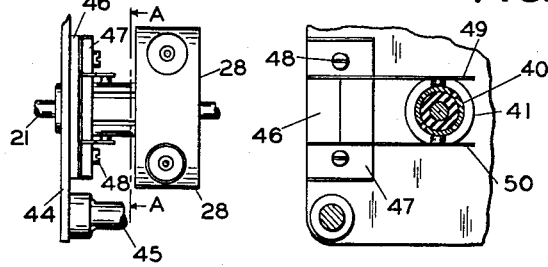
Fig. 4 is a bottom elevation of a portion of the apparatus shown in Fig. 1.
Fig. 5 is a sectional view of a part of the motor, taken on the line A—A in Fig. 4.
Figure 6:
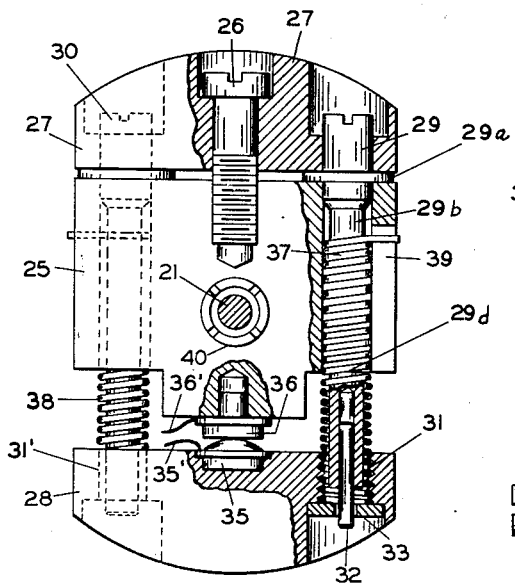
Fig. 6 is an enlarged view, partly in section, of a centrifugal device forming a part of the mechanism of the motor.

The rotating element of the motor comprises an armature having an even number of poles, a commutator, and a centrifugal device carrying electrical contacts subject to actuation in response to predetermined velocity conditions. As shown in the drawings, the magnetic system of the armature comprises a laminated structure 20 having four salient poles, and mounted on a shaft or spindle 21, of which one end is adapted to be journalled for rotation in the bearing 15. The pole faces of the structure 20 are conformed to a common cylindrical curvature coaxial with the spindle 21, and are of such diameter as to provide a minimum running clearance from the middle portions of the concave surfaces of the field pole pieces 10—11. The pole tips of the structure 20 are circumferentially extended till each subtends a geometrical angle of the order of 75 degrees, leaving between it and the adjacent pole tip a space of approximately 15 angular degrees. The field and armature structures of the motor, as thus far described, comprise a magnetic circuit adapted to utilize with a high degree of efficiency the magnetomotive force developed by the permanent magnets 12. An outstanding advantage lies in the shaping of the field pole faces to a cylindrical curvature of greater radius than that of the cylindrical curvature to which the armature pole faces are conformed. As will be apparent from the drawings, especially Fig. 3, this conformation, in conjunction with the cylindrically disposed armature poles results in an air gap narrow at the center and progressively widening toward the field pole tips, not only providing a flux density gradient conducive to desirable operating conditions in the motor but also tending to minimize diversion of flux through the tips of the field and armature poles.

On the respective salient poles of the armature structure are wound suitable coils 22 of insulated wire, and the terminals of these coils are connected to a commutator 23 having a number of segments corresponding to the number of said poles, and to a centrifugal circuit-controlling device or governor now to be described.

Fixed to the armature shaft 21 is a T-shaped block 25 of solid insulating material, which may expediently be "lucite" or an equivalent acrylic resin, adding to desirable electrical and mechanical characteristics the property of transparency, whereby to facilitate assembly and adjustment of related parts. Secured to the block 25 by a radially disposed screw 26 threaded into said block, is a weight member 27 formed of non-magnetic metal such as brass and preferably shaped on its exterior surface to the conformation of a cylinder coaxial with the armature spindle 21. Disposed on the side of the insulating block 25 diametrically opposite the weight member 27 is a further weight member 28 generally similar to the member 27, having its exterior surface conformed to the same cylindrical contour as the latter, and supported for constrained displacement with respect to the block 25 in a manner to be set forth.

Drilled or otherwise bored, formed to two parallel axes perpendicular to that of the spindle 21 and radially displaced therefrom on both sides to equal distances, are openings passing through the insulating block 25 and the two weight members carried thereby; and positioned in said openings, and rotatable therein are combined supporting and adjusting screws 29 and 30. The screw 29 comprises a slotted head portion lying in a corresponding one of the openings in the weight member 27 and neatly fitting therein, a radially projecting flange portion 29a interposed between said weight member and the mounting block 25, a short portion neatly fitting the corresponding opening in said block, an extended reduced shank portion 29b also lying within said opening and clearing the inner wall thereof by a substantial annular space, a short portion 29c provided with a thread, preferably square in section and terminated by a definite radially-extending lip portion 29d flush with the inner edge of the "cross-bar" of the T formed by the block 25, together with an extended reduced portion 29e projecting into the corresponding opening 31 in the weight member 28. Said screw 29 is further extended by means of a pin 32 of polished metal firmly fitted in a bore in said reduced portion 29e, said pin having a clearance fit in a washer 33 fitted firmly in an opening 3y in the weight 28 at the base of said opening 31.

The screw 30 may be of the same construction as the screw 29, though, if desired, its reduced shank portion (corresponding to portion 29e of screw 29) may, as shown, extend completely through the associated opening 31' in the weight 28, with consequent omission of a pin and washer corresponding to elements 32 and 33 above described.

The openings 31, 31' in the weight member 28 are each of considerably larger diameter than said extensions, and are provided with internal threads clearing the extended portions of said screws and separated therefrom by annular spaces of material width. Fitted upon the inner face of the weight member 28 is a contact piece 35 having connected thereto an electrical conductor 35'; and adapted for electrical engagement therewith is a contact piece 36 fitted to the block 25 and having connected thereto an electrical conductor 36', whereby, as said weight member is displaced toward or from said block, and electrical circuit may be made or broken between said conductors. One or both faces of said contact pieces is preferably of convex form to permit of slight rocking motion without disturbing electrical engagement.

Surrounding the screw 29 is an extended helical tension spring 37 formed of Phosphor bronze or similar non-magnetic metal of high elasticity, having several convolutions at one of its extremities screwed into the corresponding threaded opening 31 in the weight member 28, and several convolutions near its opposite extremity lying in the grooves of the thread 29c formed on the screw, a portion of said spring extending on to the un-threaded portion 29b of the shank of the screw and terminating in an outwardly extended radial portion adapted to lie in a slot 39 milled from the outside surface of the block 25 to the opening therein, whereby to prevent rotation of said spring when the screw is turned about its axis. The square section of the male thread 29c on the screw 29 obviates the tendency which a V-thread would exert to spread the spring and wedge it against the inner walls of the opening in the block 25. The space between the weight member 28 and the inner surface of the block 25, corresponding to the terminal lip 29d of the thread on the screw 29, thus defines the free or effective length of the spring 37; and it will be apparent that as the screw 29 is rotated about its axis, since the spring is prevented from rotating with the screw, that portion in engagement with the thread on said screw will function as a nut, and the effective length of the spring will be varied, thereby providing an adjustment of the tension which said spring may exert. A similar helical spring 38 is extended between the threaded portion of the screw 30 and the corresponding threaded opening in the weight member 28; and, the springs 37—38 being adjusted to substantially equal tensions, it will be seen that the contact-pieces 35—36 will be maintained in engagement with a force which may be varied at will. The extended flange portions of the screws 29—30, lying between the weight member 27 and the mounting block 25, being subject to clamping action therebetween by the screw 26, serve, when the latter is tightened, to secure said screws 29—30 in their adjusted positions. The pin 32 in cooperation with the washer 33 serves to maintain the weight member 28 in a proper position with respect to the mounting block 25, thus ensuring correct register of the contacts 35—36, without possibility of binding.

Secured to, and supported by, the insulating block 25 is a commutator member 40 having a number of segments corresponding to that of the poles in the armature, and adapted for electrical connection to the several coils of the armature winding, the extremity of said commutator remote from said block being reinforced, if desired, as by an insulating band or washer 41. The whole armature assembly, including the electromagnetic structure and the weight assembly is balanced to be in neutral equilibrium about the axis of spindle 21 when the weight member 28 is in its constrained position with the contacts 35 and 36 in mutual engagement. The end of the armature shaft 21 remote from the bearing 15 is journalled in a bearing 43 centrally positioned in an end plate 44, which, in turn, is carried by four pillars or posts 45 formed preferably as extensions of the mounting bolts 14, and of such extended length as to provide between the field poles and the bearing 43 clearance to accommodate the governor weights and the commutator 40. The extremity of the shaft 21 projects through the bearing 43, providing for the mounting thereon of a suitable gear or pulley member (not shown in the drawing).

Secured to the end plate 44 is an insulating block 46 to which are clamped by means of a further insulating block 47 and screws 48 a pair of brushes 49 and 50 mutually insulated, and bearing upon the commutator 40 at diametrically opposed positions.

Figure 7:
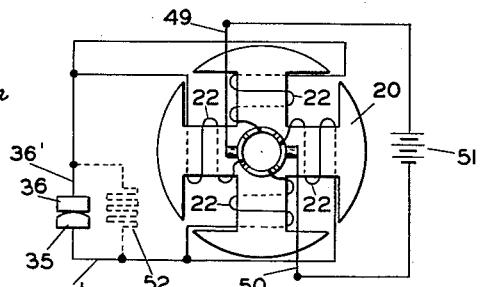
Fig. 7 is a diagrammatical view of the electric connections of a motor embodying the principles of the invention.
Figure 8:
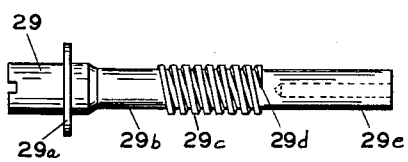
Fig. 8 is a view of a detail.

The electrical connections of the motor are shown in Fig. 7. Designating for purposes of distinction one set of similar terminals of the several armature coils 22 as the "inner," and the other set as the "outer" ends of said coils, the former are directly connected in order to the corresponding segments of the commutator 40. These connections are made such in relation to other elements of the structure that the segments engaged at any moment by the brushes are those connected to the windings on the armature poles at that time in transit from the influence of a field pole of one polarity to that of a field pole of opposite polarity, the intermediate segments being connected to those poles which are at the moment in the positions of most intense field. The "outer" terminals of said windings are interconnected in such a manner that those on adjacent poles comprising one half of the armature are connected to one, and those on adjacent poles comprising the other half of the armature to the other, of the electrical conductors 35' and 36', and thereby to the contacts 35—36. With this connection, it will be seen that for substantially every angular position of the armature there will exist between the brushes 49—50 a path including said contacts and two of the armature coils in series, while with said contacts separated, there will be an open circuit between said brushes. Upon the two brushes being connected to the terminals of a battery 51 or other source of unidirectional potential a current will flow through one brush to the engaged commutator segment, through the corresponding armature coil, the contacts 35—36, the opposite armature coil, the corresponding commutator segment, and the other brush, to the battery, thus tending to magnetize the armature in a sense perpendicular to the general direction of the main field through the armature, and thereby, according to the wellknown principle of the direct-current motor, to produce rotation of the armature, which rotation will continue indefinitely so long as potential from the battery is applied to the brushes, and the angular velocity of the armature, including the weighted structure, does not exceed a value where centrifugal force exerted upon the weight member 28 becomes sufficient to overcome the influence of the springs 40—41 and cause the contacts 35—36 to be separated. Upon the armature accelerating to a speed where said contacts are opened, the circuit through the windings will be interrupted, and the armature will tend to reduce its velocity, correspondingly decreasing the centrifugal force, until, under the influence of the springs, the contacts are again closed. Should operating conditions render such desirable, the contacts 35—36 may be bridged by a suitable resistor 52 (shown dotted in Fig. 7) carried by the rotating structure and by the selection of whose resistance value there may be effected a wide range of modification of governor performance.

Because of the straight-line action of the governor, and the frictionless support of the floating weight 28, the velocity increment between an open and a closed condition of the contacts can be made extremely small, with the result that governing will take place within a very narrow range of speed variation, giving a correspondingly close approach to constant speed operation. Because the floating weight 28 is carried on a suspension without journals to demand lubrication, the use of oil with its attendant variations in viscosity with temperature change is eliminated. The block 25 being formed of an acrylic resin, which is characterized by an expansion temperature coefficient of from four to five times that of brass or bronze, has an inherent tendency by its changes in linear dimensions to vary the distance from the axis of the shaft 21 to the face of said block upon which rest the flanges of the screws 29—30, and thereby to vary the tension on the springs 37—38 and offset changes in the elasticity of said springs over wide ranges of temperature. If desired, the compensation may be increased by forming the screws 29—30 of Invar or similar material, having a negligible, or zero, temperature coefficient of linear expansion.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In an electric motor, a stationary field structure, a rotatable armature structure having an even number of poles, a commutator having the same number of mutually insulated segments as the number of said poles, coils on said poles to magnetize the same with alternating polarity, mutually corresponding ends of coils on one group of adjacent poles constituting half those on the armature being connected to a first common conductor, mutually corresponding ends of coils on the group of adjacent poles constituting the other half of the armature being connected to a second common conductor, the free ends of said coils being individually connected to said commutator segments, and means for interconnecting and for interrupting connection between said first and second common conductors.

2. In an electric motor, a stationary field structure, a rotatable armature structure having an even number of salient poles, a commutator having the same number of mutually insulated segments as the number of said poles, coils on said poles to magnetize the same with alternating polarity, mutually corresponding ends of coils on one group of adjacent poles constituting half those on the armature being connected to a first common conductor, mutually corresponding ends of coils on the group of adjacent poles constituting the other half of the armature being connected to a second common conductor, the free ends of said coils being individually connected to said commutator segments, and means wholly carried by said armature for interconnecting and for interrupting connection between said first and second common conductors.

3. In an electric motor, a stationary field structure, a rotatable armature structure having an even number of salient poles, a commutator having the same number of segments as the number of said poles, coils on said poles to magnetize the same with alternating polarity, mutually corresponding ends of coils on one group of adjacent poles constituting half those on the armature being connected to a first common conductor, mutually corresponding ends of coils on the group of adjacent poles constituting the other half of the armature being connected to a second common conductor, the free ends of said coils being individually connected to said commutator segments, and means wholly carried by said armature and comprising a single pair of contacts providing interconnection between said first and second common conductors.

JOHN L. RUSSELL.

REFERENCES CITED

The following references are of record in the file of this patent:

UNITED STATES PATENTS

| Number | Name | Date |
|---|---|---|
| 291,636 | Stockwell | Jan. 8, 1884 |
| 400,971 | Thompson | Apr. 9, 1889 |
| 478,475 | Secor | July 5, 1892 |
| 588,692 | Cushman | Aug. 24, 1897 |
| 771,269 | Reist | Oct. 4, 1904 |
| 1,791,149 | Sibley | Feb. 3, 1931 |
| 1,868,616 | Salmon | July 26, 1932 |
| 2,032,444 | Schwarz | Mar. 3, 1936 |
| 2,250,983 | Adler | July 29, 1941 |
| 2,250,984 | Adler | July 29, 1941 |

FOREIGN PATENTS

| Number | Country | Date |
|---|---|---|
| 440,309 | Great Britain | Dec. 24, 1935 |